No. 12,575.
REISSUED DEC. 11, 1906.
S. E. KURTZ.
MOTOR PLOW.
APPLICATION FILED OCT. 9, 1906.
Fig. 1.
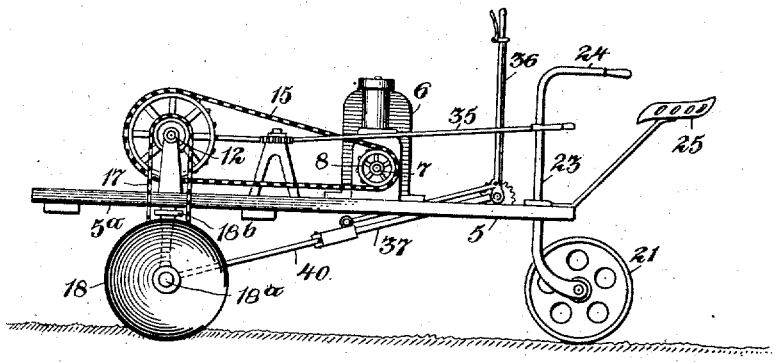
Fig. 2.
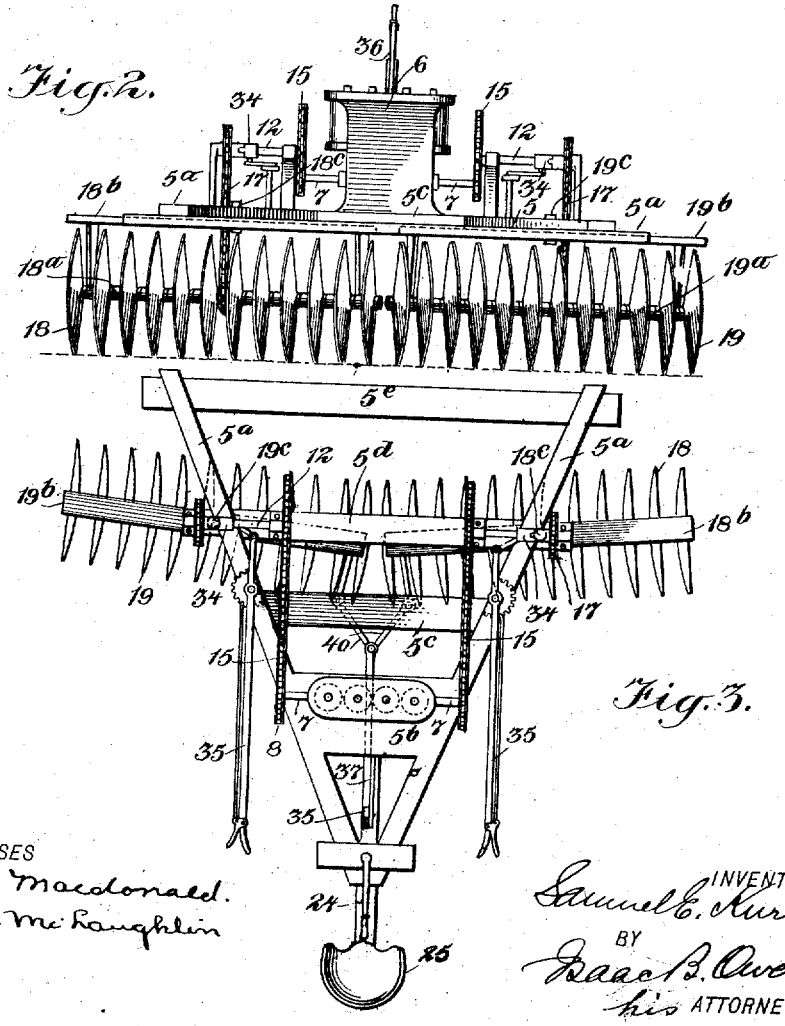
Fig. 3.
WITNESSES
John K. Macdonald.
Ethel G. McLaughlin
INVENTOR
Samuel E. Kurtz
BY
Isaac B. Owens.
his ATTORNEY

UNITED STATES PATENT OFFICE.

SAMUEL E. KURTZ, OF ODEBOLT, IOWA, ASSIGNOR, BY MESNE ASSIGNMENTS, TO INTERNATIONAL MOTOR PLOW COMPANY, OF CHICAGO, ILLINOIS, A CORPORATION OF SOUTH DAKOTA.

MOTOR-PLOW.

No. 12,575. Specification of Reissued Letters Patent. Reissued Dec. 11, 1906.

Original No. 781,214, dated January 31, 1905. Application for reissue filed October 9, 1906. Serial No. 338,193.

*To all whom it may concern:*

Be it known that I, SAMUEL E. KURTZ, of the city of Odebolt, Sac county, and State of Iowa, have invented certain new and useful Improvements in Motor-Plows, of which the following is a full, clear, and exact specification, such as will enable others skilled in the art to which it appertains to make and use the same.

My invention relates to a motor-driven plow in which the motor or engine and the plowing or cultivating tools or instruments are arranged on a frame common to both and form therewith a single concrete or "self-contained" apparatus.

The primary object of my invention is to so organize a plow of this type that it will meet all of the trying conditions incident to actual use, and thus be capable of successful and sustained operation in the field, a result which, to the best of my knowledge and belief, was never attained with the type of plow named prior to my invention. This end I reach by employing a cultivating or plowing tool or instrument which simultaneously with and from the nature of its cultivating or plowing action exerts on the machine a propelling influence along a line oblique to the line of travel of the machine, which tool or instrument is positively driven by the motor or engine of the machine and the lateral propelling tendency of which is resisted by means provided for that purpose sufficiently to set up a resultant force which sends the machine straight ahead along its normal or intended line of travel, the said tool or instrument and said means resisting the lateral tendency thereof, bearing the major portion of the weight of the machine and sufficient thereof to give the tool or instrument hold in the ground, whereby said parts constitute the sole propelling means of the plow.

As here show and as is preferred, the cultivating or plowing tool or instrument is formed of a gang of disk-like elements of a form heretofore well-known in agricultural apparatus, which elements work on a common axis normally diagonal to the line of travel or longitudinal line of the plow and which are geared with the engine to be driven positively therefrom, so that they have the dual action described, and the means here shown and preferred for resisting the lateral propelling influence consist of a similar gang of tools similarly driven and acting oppositely to the first gang, so that the resultant of the forces involved is propulsion directly ahead simultaneously with a plowing or cultivating action sustained equally by the two gangs of tools.

In the preferred embodiment of my invention the gangs of tools are adjustable to change their position with respect to the line of movement of the plow to control the action of the machine.

The invention involves various other features of major or minor importance, all of which will be fully set forth hereinafter, and particularly pointed out in the claims.

Reference is had to the accompanying drawings, which represent, as an example, one manner in which the principles of my invention may be practically embodied, and in which—

Figure 1 is a side view of the motor-plow. Fig. 2 is a front view thereof, and Fig. 3 is a plan view.

The apparatus has a main frame $5^a$, $5^b$, $5^c$, $5^d$, and $5^e$, which may be of any suitable form. Under this frame are arranged the two gangs of tools or instruments 18 and 19, here shown as circular concavo-convex disks, but which may be of other construction, if desired. The members of each gang of disks are rotatably carried by axial shafts $18^a$ and $19^a$, which in turn support in any suitable manner tool or auxiliary frames $18^b$ and $19^b$. The tool-frames $18^b$ and $19^b$ are arranged under and connected with the main frame by any desired means, (indicated at $18^c$ and $19^c$ in the drawings,) so that the disks 18 and 19 support the front portion of the plow, bear the major portion of the weight thereof, and may be adjusted in gangs to change the inclination of the shafts $18^a$ and $19^a$ to the longitudinal or line of travel of the plow. For so adjusting the gangs of disks a hand-lever 36 is provided. This lever is mounted on the main frame and articulated to the disk gangs by a linkage 37 and 40, which may be of any suitable form.

On the main frame is mounted the engine or motor 6, the shaft 7 of which is connected by chain gearing 15 to rotary counter-shafts 12, suitably mounted on the main frame. These counter-shafts 12 are connected by clutches 34 with chain gearings 17, respectively, driving the shafts 18[a] and 19[a] of the gangs of disks 18 and 19, said gearing 17 being so organized as to permit the aforesaid adjustment of the disk gangs without interfering with the proper operation of the gearings. The clutches 34 are adapted to be actuated by hand-levers 35, articulated thereto so that the drive of the tools may be controlled.

For assisting disks 18 and 19 in the support of the plow a ground-wheel 21 is provided, and this is carried in a vertical fork 23, arranged to turn in the main frame and provided with a handle 24, so that the wheel 21 may be oscillated, thus enabling it to serve the further function of a means for steering the plow.

25 indicates a seat for the operator, which seat is mounted on the main frame and to which the levers 35 and 36 and handle 24 are juxtaposed, as shown.

By referring to the drawings, particularly Fig. 3, it will be seen that the diagonally-disposed gang of disks 18, for example, in rotating under the action of the engine tends to move the plow off on a slant to the left, while the gang of disks 19 tends to move the plow off on a slant to the right. The resultant of these forces is movement of the plow straight ahead, each gang of disks or tools acting as a means for resisting the lateral propelling influence of the other and further serving to plow or otherwise cultivate the earth. This principle of operation is of special importance in connection with apparatus equipped with rotary disk or other similar cultivating or plowing tools or instruments by reason of the fact that such disks act effectually as plows or cultivators only when advancing through the earth with their planes at an angle to the line of movement. However, to so dispose the disks and rotate them would result in sending the machine off along a line of movement parallel to the planes of the disks and defeat the plowing purpose; but by employing some means for resisting the lateral tendency of the disks I hold the plow to its course and cause the disks to be advanced through the earth in the effective position mentioned above. Further, by making this means for resisting the lateral tendency of the disks—a second gang of disks—I cause a double plow to result and one in which each gang of disks performs three distinct yet interessential purposes—to wit, cultivating the earth, propelling the plow, and resisting the lateral tendency of the other gang to insure the advance of the disks positioned for effectual operation. It is also pointed out that by adjusting the gangs of tools or disks so that their axes are disposed at true right angles to the line of travel of the plow the disks serve merely to propel the apparatus and do not then have any cultivating action.

Having thus specifically described one manner of practically embodying my invention, what I claim as new, and desire to secure by Letters Patent of the United States, is—

1. In a motor-plow, the combination of a cultivating-tool exerting during its cultivating action, a propelling influence along a line oblique to the line of travel of the plow, a motor mounted on said plow and geared to the tool to drive the same, and means resisting the lateral tendency of said cultivating-tool and causing the plow to move straight ahead; the said cultivating-tool and said resisting means bearing the major portion of the weight of the machine.

2. In a motor-plow, the combination of sets of rotary disks normally disposed with their axes oblique to the line of travel of the plow and inclined oppositely to each other, and a motor on the plow and geared to the disks; said disks bearing the major portion of the weight of the machine and exerting during their cultivating action, propelling influences in opposite directions oblique to the line of travel of the plow, whereby the resultant force sends the plow straight ahead.

3. In a motor-plow the combination of sets of rotary disks normally disposed with their axes oblique to the line of travel of the plow and inclined oppositely to each other, means for adjusting the inclination of the axes of said disks to control the action of the plow, a motor on the plow gearing connecting the motor with the disks to drive the same, the gearing permitting adjustment of the inclination of the axes of the disks without interfering with the transmission of power to the disks, and the disks bearing the major portion of the weight of the plow to give the disks hold in the ground, said disks exerting during their cultivating action, propelling influences in opposite directions oblique to the line of travel of the plow, whereby the resultant force sends the plow straight ahead.

4. In a motor-plow, the combination of a cultivating-tool exerting during its cultivating action, a propelling influence along a line oblique to the line of travel of the plow, a motor mounted on said plow and geared to the tool to drive the same, and means resisting the lateral tendency of said cultivating-tool and causing the plow to move straight ahead; the said cultivating-tool and said resisting means bearing the major portion of the weight of the machine, and means for steering the plow.

SAMUEL E. KURTZ.

Witnesses:

ARTHUR D. RANSTEAD,
ALBERT E. COOK.